United States Patent
Marin Perales et al.

(10) Patent No.: US 10,450,457 B2
(45) Date of Patent: Oct. 22, 2019

(54) POLYALKYLENCARBONATE AND POLYHYDROXYALKANOATE BLENDS

(71) Applicant: Repsol, S.A., Madrid (ES)

(72) Inventors: Laura Marin Perales, Madrid (ES); Sonia Segura Fernandez, Madrid (ES); Monica Garcia Ruiz, Madrid (ES); Borja Arandilla, Madrid (ES); Carolina Ruiz Orta, Madrid (ES); Rodrigo Paris, Madrid (ES)

(73) Assignee: REPSOL, S.A., Madrid (ES)

( * ) Notice: Subject to any disclaimer, the term of this patent is extended or adjusted under 35 U.S.C. 154(b) by 0 days.

(21) Appl. No.: 15/566,819

(22) PCT Filed: Apr. 15, 2016

(86) PCT No.: PCT/EP2016/058364
§ 371 (c)(1),
(2) Date: Oct. 16, 2017

(87) PCT Pub. No.: WO2016/166292
PCT Pub. Date: Oct. 20, 2016

(65) Prior Publication Data
US 2018/0127578 A1 May 10, 2018

(30) Foreign Application Priority Data

Apr. 17, 2015 (EP) .................................... 15382187

(51) Int. Cl.

| | | |
|---|---|---|
| *C08L 69/00* | (2006.01) | |
| *C09J 167/04* | (2006.01) | |
| *C09J 169/00* | (2006.01) | |
| *C08L 67/04* | (2006.01) | |
| *C08G 63/06* | (2006.01) | |
| *C08G 64/02* | (2006.01) | |

(52) U.S. Cl.
CPC .............. *C08L 69/00* (2013.01); *C08L 67/04* (2013.01); *C09J 167/04* (2013.01); *C09J 169/00* (2013.01); *C08G 63/06* (2013.01); *C08G 64/02* (2013.01); *C08L 2201/10* (2013.01); *C08L 2201/52* (2013.01); *C08L 2205/02* (2013.01); *C08L 2666/18* (2013.01)

(58) Field of Classification Search
None
See application file for complete search history.

(56) References Cited

U.S. PATENT DOCUMENTS

| | | | |
|---|---|---|---|
| 2010/0305280 A1* | 12/2010 | Whitehouse | A47L 13/17 525/450 |
| 2011/0218321 A1* | 9/2011 | Steinke | C08G 59/68 528/414 |
| 2013/0065046 A1* | 3/2013 | Krishnaswamy | C08L 67/04 428/336 |

FOREIGN PATENT DOCUMENTS

| | | | |
|---|---|---|---|
| CN | 101475734 | * | 7/2009 |
| EP | 2664641 | * | 11/2013 |
| JP | 06345956 | * | 12/1994 |
| WO | WO 2004/076583 A1 | | 9/2004 |
| WO | WO 2011/146484 A2 | | 11/2011 |
| WO | WO 2013/165117 A1 | | 11/2013 |
| WO | WO 2014/058655 A1 | | 4/2014 |

OTHER PUBLICATIONS

Heaton; The Chemical Industry (1994) pp. 113-114. (Year: 1994).*
Chen, L. et al., Crystallization Behavior and Thermal Properties of Blends of Poly (3-hydroxybutyate-co-3-valerate) and Poly (1,2-propandiolcarbonate). Macromolecular Symposia. (2004). 210:241-250.
International Search Report and Written Opinion for International Application No. PCT/EP2016/058364 dated Dec. 8, 2016 (3 pages).
International Preliminary Report on Patentability for International Application No. PCT/EP2016/058364 dated Jul. 11, 2017(14 pages).

* cited by examiner

*Primary Examiner* — David J Buttner
(74) *Attorney, Agent, or Firm* — Andrus Intellectual Property Law, LLP

(57) ABSTRACT

The present invention is directed to a polymer blend comprising at least one polyalkylencarbonate (PAC) and at least one polyhydroxyalkanoate (PHA) with low crystallinity. The invention also describes processes to prepare the blends of the invention and articles made of said blends.

15 Claims, 2 Drawing Sheets

POLYALKYLENCARBONATE AND POLYHYDROXYALKANOATE BLENDS

CROSS-REFERENCE TO RELATED APPLICATIONS

This patent application is a national stage filing under 35 U.S.C. 371 of International Application No. PCT/EP2016/058364, filed Apr. 15, 2016, which claims the benefit of priority of European Patent Application No. 15382187.1, filed Apr. 17, 2015, both of which are incorporated herein by reference in their entireties.

FIELD OF THE INVENTION

The invention relates to biodegradable blends of poly (alkylene carbonates) with polyhydroxyalkanoates, having improved thermal and mechanical properties, and to the use thereof in the preparation of articles and adhesives.

BACKGROUND OF THE INVENTION

Poly(alkylene carbonates) (PACs) have attracted much attention because of their environmental friendly nature, biodegradability, transparency and good gas barrier properties. These polymers, first prepared by Inoue (Inoue, S. et al, Journal of Polymer Science, Polymer Letter Edition 7, 287 (1969)), are readily obtained by copolymerization of an alkylene oxide and $CO_2$. PACs such as Polypropylene Carbonate (PPC) are typically amorphous and biodegradable, but exhibit poor mechanical properties and lack sufficient thermal stability. They are brittle and readily decomposed at moderate temperature, limiting the applications in which they can be useful. To improve their mechanical properties and thermal stability PACs have been blended with further polymers. For example, WO 2011/005664 describes blends of specific PPC based polymers with polyolefins, namely, low density and high-density polyethylene, as well as polypropylene.

These polymers are however not biodegradable. In order to attend the increasing environmental concerns, PACs have been mixed with poly-3-hydroxyalkanoates, namely poly-3-hydroxybutyrate (3-PHB), poly(3-hydroxybutyrate-co-3-hydroxyvalerate) (3-PHBHV) and other copolymers of 3-PHB (e.g. poly(3-hydroxybutyrate-co-3-hydroxyhexanoate)-PHBHHx). 3-PHB and its copolymers are biodegradable polyesters that can be obtained by fermentation, readily available from sources that do not compete with food. Their biodegradability makes them an alternative in PAC based blends.

3-PHB and its copolymers are not however entirely satisfactory and have limited applicability. For example, U.S. Pat. No. 6,576,694 blends PAC, namely PPC, with 3-PHB and 3-PHBHV to yield blends of improved stability, but which are opaque and require further improvement in the mechanical properties thereof. This fact is noted by WO 2007/125039, wherein mixtures of PPC and polylactic acid are proposed, for example, in order to obtain transparent mixtures. Alternatively, low amounts of 3-PHBV are proposed.

WO 2012/007857 discloses a mixture of PAC, thermoplastic cellulose (TPC) and 3-PHB or 3-PHBV. No mention is made of the transparency of the resulting blends and according to this document mixtures of PAC with 3-PHB or 3-PHBV perform poorly in terms of strength and ductility with respect to ternary mixtures of PAC, TPC and PHA.

WO 2014/058655 discloses mixtures of different PHA molecules and methods to prepare such mixtures of PHAs. Although it is generically mentioned that the mixtures of PHAs disclosed therein can be combined with other polymers, it does not disclose any specific example of such blends nor any possible advantages which such blends could bring about.

Thus, mixtures of PACs and polyhydroxyalkanoates described to the date (PAC blended with 3-PHB, 3-PHBV or copolymers thereof) provide blends with poor properties. For example, they lack transparency and frequently result in opaque blends. Other mechanical (e.g. Charpy impact) and thermal properties (e.g. thermal stability) also require improvement in order to further expand the usefulness of PACs, which are otherwise interesting materials due to their environmentally friendly nature.

SUMMARY OF THE INVENTION

Figure 1:
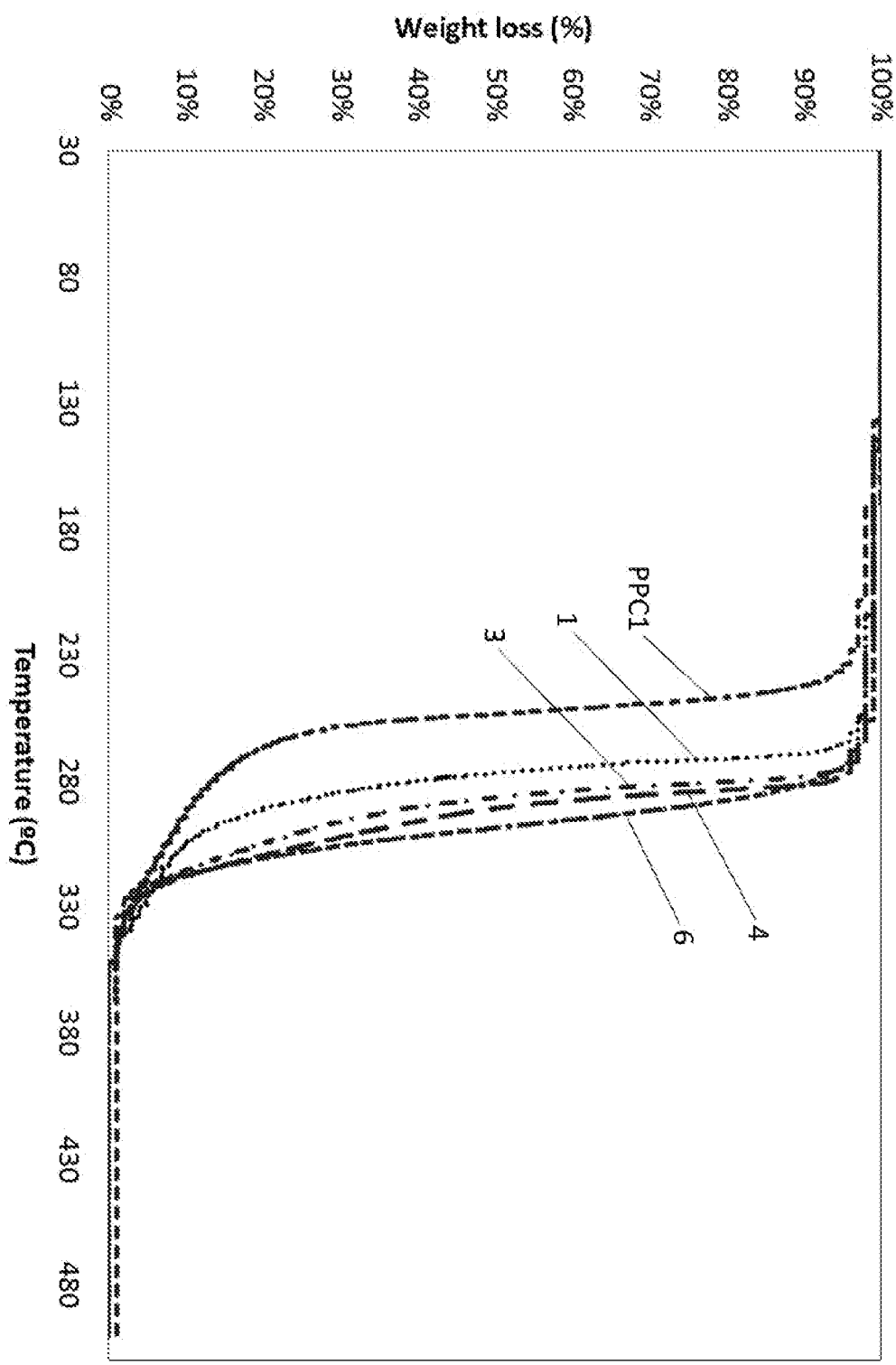
FIG. 1: TGA of PPC1 [100%], blend 1 (PPC1 [99.5%] & PHOHHX [0.5%]), blend 3 (PPC1 [95%] & PHOHHX [5%]), blend 4 (PPC1 [90%] & PHOHHX [10%]) and blend 6 (PPC1 [70%] & PHOHHX [30%]).

The present invention solves the above problems by providing improved blends of PACs with PHAs. The blends of the invention cannot only be transparent, but have interesting mechanical and thermal properties, which improve existing materials, and even open the doors to new applications.

The inventors have come to realize that the addition of PHAs having low crystallinity to PACs not only surprisingly keep positive characteristics of the latter (e.g. transparency), but even more surprisingly improve at the same time their thermal and mechanical properties. Short chain length PHAs (e.g. 3-PHB or 3-PHBHV) used in the prior art are on the other hand highly crystalline. It is thus a first aspect of the invention to provide a blend (blend of the invention), preferably transparent, comprising at least one poly(alkylene carbonate) and at least one polyhydroxyalkanoate, wherein said at least one polyhydroxyalkanoate has a degree of crystallinity of less than 40%, preferably of less than 20%, wherein crystallinity is determined by DSC (in the present application referred to "low crystallinity PHAs" or "PHAs with low crystallinity"). Immediate applications of the blends of the invention are found in the packaging industry, were transparency provided by PACs is much appreciated, but require improvements in the thermal and mechanical properties thereof. As described below, the transparency of the blends of the invention is acceptable even for large loads of such low crystallinity PHAs, and other important properties, such as thermal stability or resistance to impact, are also improved. Therefore, the blends of the invention are preferably transparent (see the detailed description and example 3 below for an explanation and determination of transparency according to the present invention). The blends of the invention therefore represent a significant improvement with respect to existing products. These can be realized in more detail in the comparative examples disclosed herein.

The present invention opens the door to a new family of biodegradable polymer blends having properties that can be adjusted by controlling the load of the low crystallinity PHA, and can thus be useful in different applications. For example, lower loads of low crystallinity PHA (e.g. less than 20% wt) provide blends having low or no adhesiveness, useful for preparing films, such as films required for packaging. Higher loads provide highly adhesive products. The blends of the invention are thus suitable for manufacturing articles, which are a further aspect of the invention. A further aspect of the invention is the use of the blend of the invention for manufacturing articles. Further aspects of the invention are methods to manufacture said articles, such as for example, blowing, injecting, extruding or thermoforming.

The blends of the invention are further interesting since they have shown adhesiveness with moderate to high loads of low crystallinity PHAs. It is thus a further aspect of the invention the use of the blends of the invention as adhesive. A further aspect of the invention is an adhesive, for example, pressure sensitive or hot-melt, comprising the blend of the invention.

The blend of the invention can be manufactured following known techniques, such as neat mixing or solvent mixing, and it is a further aspect of the invention a process for manufacturing the blend of the invention comprising the step of mixing a PAC with a low crystallinity PHA.

DESCRIPTION OF THE INVENTION

Poly(Alkylene Carbonates) (PACs)

PACs are polymers showing ether and carbonate units (Encyclopedia of Polymer Science and Technology, Johnson Wiley and sons, Vol. 3). They are typically prepared by copolymerization of one or more epoxides with $CO_2$, although the present invention is not limited to those prepared by such methods. PACs are known in the art, and the skilled person can select from a wide range attending, for example, to their structure, molecular or physical properties.

According to an embodiment of the invention, the PAC derives (either by being actually used or notionally) from one or more epoxides selected from the group consisting of $(C_2-C_{20})$alkyleneoxide, $(C_1-C_{20})$alkyloxy, $(C_6-C_{20})$ aryloxy, $(C_6-C_{20})$arylalkyloxy, $(C_4-C_{20})$cycloalkyloxide, $(C_5-C_{20})$ cycloalkyleneoxide and mixtures thereof. Exemplary, non-limitative epoxide compounds may be one or more selected from the group consisting of ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrine, epibromohydrin, glycidyl methyl ether, glycidyl ethyl ether, glycidyl normal propyl ether, glycidyl sec-butyl ether, glycidyl normal or isopentyl ether, glycidyl normal hexyl ether, glycidyl normal heptyl ether, glycidyl normal octyl or 2-ethyl-hexyl ether, glycidyl normal or isononyl ether, glycidyl normal decyl ether, glycidyl normal dodecyl ether, glycidyl normal tetradecyl ether, glycidyl normal hexadecyl ether, glycidyl normal octadecyl ether, glycidyl normal icocyl ether, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxide norbonene, limonene oxide, dieldrin, 2,3-epoxide propyl benzene, styrene oxide, phenyl propylene oxide, stilbene oxide, chlorostilbene oxide, dichlorostilbene oxide, 1,2-epoxy-3-phenoxypropane, benzyl oxymethyl oxirane, glycidyl-methylphenyl ether, chlorophenyl-2,3-epoxide propyl ether, epoxypropyl methoxyphenyl ether, biphenyl glycidyl ether, glycidyl naphthyl ether, glycidyl acetic acid ester, glycidyl propionate, glycidyl butanoate, glycidyl normal pentanoate, glycidyl normal hexanoate, glycidyl heptanoate, glycidyl normal octanoate, glycidyl 2-ehtyl hexanoate, glycidyl normal nonanoate, glycidyl normal decanoate, glycidyl normal dodecanoate, glycidyl normal tetradecanoate, glycidyl normal hexadecanoate, glycidyl normal octadecanoate, and glycidyl icosanoate.

According to an embodiment of the invention, the PAC is a compound of formula (I):

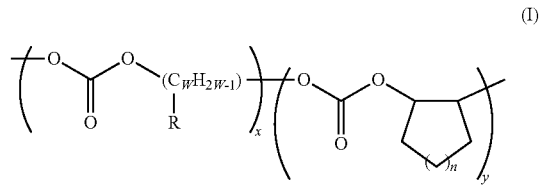

wherein
w is an integer between 2 and 10;
x is an integer equal or greater than 5, preferably from 5 to 100;
y is an integer between 0 and 100;
n is an integer between 1 and 3; and
each R is independently selected from hydrogen, $(C_1-C_4)$alkyl, or $-CH_2-O-R'$, wherein R' is $(C_1-C_8)$ alkyl
and each repeating unit can have the same or a different value for w and/or n.

According to an embodiment of the invention, the PAC can be based on a C2-C6 oxirane, for example a C2, a C3 or a C4, such as poly(ethylene carbonate) (PEC), poly(propylene carbonate) (PPC—see for example, Luinstra G. A.; Borchardt E., *Adv Polym Sci* (2012) 245: 29-48 and Luinstra, G. A., *Polymer Reviews* (2008) 48:192-219,), poly (butylene carbonate), or poly(hexylene carbonate). Examples of cyclic aliphatic carbonate may include poly (cyclohexene carbonate), poly(norbornene carbonate) or poly(limonene carbonate). The PAC can be a poly(propylene carbonate), poly(ethylene carbonate), or mixtures thereof. Therefore, the present invention also includes mixtures of different PACs. Such mixtures can be, for example, PAC comprising units of PPC and PEC, or PPC or PEC with other PACs, such as poly(butylene carbonate), poly(hexylene carbonate), poly(cyclohexene carbonate), poly(norbornene carbonate) or poly(limonene carbonate). In the present invention "alkylene oxide", "epoxide" or "oxirane" are all considered equivalent.

The number-averaged molecular weight of the PACs is not critical and can be comprised between 10,000 and 500,000 Da, for example between 40,000 and 300,000 Da. The typical glass transition (Tg) of the PACs of the invention is comprised between 5° C. and 140° C., for example, between 5° C. and 100° or between 5° and 40° C.

Polyhydroxyalkanoates (PHA)

So far, highly crystalline PHAs, such as 3-PHB or 3-PHBHV, have been used in mixtures with PACs. Their use is however limited by the poor transparency of the blends obtained. Also, such highly crystalline PHAs provide a limited improvement of the Charpy impact and no adhesiveness at all. The inventors have discovered that low crystallinity PHAs provide improved blends when mixed with PACs. They are typically transparent and have improved Charpy impact and adhesiveness at high loads.

The PHAs of the invention are therefore any having a degree of crystallinity of less than 40%. In alternative embodiments the PHAs used in the blend of the invention have a crystallinity of less than 35%, preferably of less than 30%, preferably of less than 25%, more preferably of less than 20%.

PHAs, including those of the invention, are typically synthesized by a broad range of natural and genetically engineered bacteria as well as genetically engineered plant crops (Braunegg et al., 1998, J. Biotechnology 65: 127-161; Madison and Huisman, 1999, Microbiology and Molecular Biology Reviews, 63: 21-53; Poirier, 2002, Progress in Lipid Research 41: 131-155). Useful microbial strains for producing PHAs, include, but are not limited to *Alcaligenes eutrophus* (renamed as *Ralstonia eutropha*), *Alcaligenes latus*, *Azotobacter, Aeromonas, Comamonas, Pseudomonas*, and genetically engineered organisms including genetically engineered microbes such as *Pseudomonas, Ralstonia* and *Escherichia coli*.

It has also been found that PHAs having a glass transition (Tg) in the range between −80° C. to −5° C. are preferred.

PHAs can be used as long as they have low crystallinity (below 40% according to DSC measured as explained in example 4). According to an embodiment of the invention, the PHA used in the blend of the invention is a PHA with low crystallinity of formula (II), which includes stereoisomers thereof

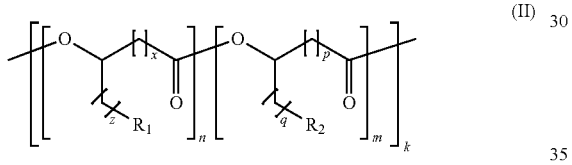

(II)

wherein n, m or k are each independently an integer;
p and q are integers adding between 3 and 17;
x and z are integers adding between 4 and 17; and
each of $R_1$ and $R_2$ is independently selected from hydrogen or methyl.

According to an embodiment of the invention, the PHA comprises beta-substituted monomers wherein x or p are 1. According to a further embodiment of the invention, the PHA comprises gamma-substituted monomers wherein x or p are 2. According to an embodiment of the invention R1 and R2 are methyl, p and q are integers adding between 3 and 17, and x and z are integers adding between 5 and 17. According to an embodiment of the invention R1 and R2 are methyl, p and q are integers adding between 4 and 17, and x and z are integers adding between 5 and 17. According to a further embodiment of the invention, R1 and R2 are methyl p and q are integers adding between 3 and 7; and x and z are integers adding between 5 and 9. According to an embodiment of the invention, x is 1 and z is 2, 3, 4, 5, 6, 7, 8, 9, 10 or 11, preferably 4, 5, 6, 7 or 8. According to another example, x and p are 1, q is 3, 4, 5 or 6 and z is 4, 5, 6, 7 or 8. According to a further embodiment, q is 0 and $R_2$ is hydrogen. The integers n, m and k determine the size and molecular weight of the PHA and their value is not critical for the present invention, and can each independently be comprised between 1 and 10,000 as long as k is at least 1 and the sum of n and m is at least 1 (e.g. 10-8,000), typically between 500 and 5,000, more typically between 700 and 4,000.

According to an embodiment of the invention, all monomers of at least one of the PHAs used in the blends of the invention comprise 6 or more carbon atoms, preferably between 6 and 20 carbon atoms. In another embodiment, all monomers of at least one of the PHAs used in the blends of the invention comprise between 6 and 12 carbon atoms, preferably between 6 and 9 carbon atoms. Alternatively, at least one of the monomers of at least one of the PHAs used in the blends of the invention comprises 7 or more carbon atoms, and all monomers of said PHA comprise more than 6 carbon atoms, preferably between 6 and 20 carbon atoms, more preferably between 6 and 12 carbon atoms, more preferably between 6 and 9 carbon atoms.

According to an embodiment of the invention, the PHA used in the blend of the invention is a PHA with low crystallinity of formula (III), which includes stereoisomers thereof

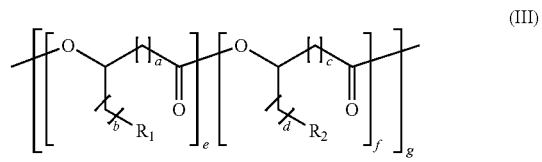

(III)

wherein e, for g are each independently an integer;
c is an integer between 0 and 10;
a is an integer between 0 and 10;
wherein at least one of a or c is 2 or greater;
b and d are integers independently selected from 0 to 15; and
each of $R_1$ and $R_2$ is independently selected from hydrogen or methyl.

According to an embodiment of the invention, the PHA comprises two gamma-substituted monomers, i.e. a PHA wherein a and c are both 2. According to a further embodiment of the invention, the PHA comprises monomers wherein b and d are each independently selected from 0 to 10, preferably from 0 to 5. According to an embodiment of the invention R1 and R2 are hydrogen. According to a further embodiment each of c and a are independently selected from 2 or 3. The integers e, f and g determine the size and molecular weight of the PHA and their value is not critical for the present invention, and can each independently be comprised between 0 and 10,000 as long as g is at least 1 and the sum of e and f is at least 1, typically between 500 and 5,000, more typically between 700 and 4,000.

According to an embodiment of the invention, the PHA used in the blend of the invention is a PHA with low crystallinity of formula (IV), which includes stereoisomers thereof

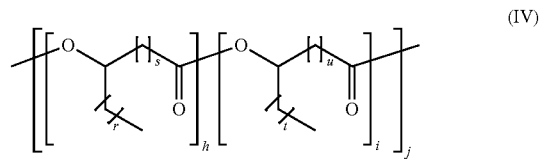

(IV)

wherein h, i or j are each independently an integer;
s is an integer between 1 and 5;
u is an integer between 1 and 5;
r and t are integers independently selected from 0 to 15; and
wherein when s and u are 1 and each of r and t are 0 or 1, at least one of s and u is 2 or more.

Thus, the polyester backbone of PHAs used in the blends of the invention may include an aliphatic pending group, usually in beta or gamma position (poly-3- or poly-4-hydroxyalkanoates, respectively), with respect to the carbonyl unit. The PHAs used in the present invention may also include poly-5- or poly-6-hydroxyalkanoates. The polymers used in the blend of the invention can have a variety of molecular weights and molecular weight distributions, which is not critical to achieving the purposes of the invention. The polymers typically have a number averaged molecular weight over 300 Da, for example between 300 and $10^7$ Da, and in a preferred embodiment 10,000 to 1,000,000 Daltons. Number-averaged molecular weights (Mn) and polydispersity indices (Mw/Mn) were determined against PS standards by gel-permeation chromatography (GPC) using a Bruker 3800 equipped with a deflection RI detector. Tetrahydrofuran or Chloroform at 1 mL/min flow rate was used as eluent at room temperature.

According to an embodiment of the invention, at least one of the PHAs used in the blend of the invention is of formula (II), or a stereoisomer thereof, wherein k is an integer comprised between 50 and 50,000. According to a further embodiment, n and m is an integer independently comprised between 10 and 8,000.

The PHAs used in the blends of the invention can be either homopolymers or co-polymers, for example, copolymers of a 3-hydroxyalkanoate and/or copolymers of a 4-hydroxyalkanoate.

In general, a PHA is formed by enzymatic polymerization of one or more monomer units inside a living cell. Examples of monomer units that can make the PHAs used in the blends of the invention include glycolic acid, 3-hydroxypropionate, 3-hydroxyhexanoate, 3-hydroxyheptanoate, 3-hydroxyoctanoate, 3-hydroxynonanoate, 3-hydroxydecanoate, 3-hydroxydodecanoate, 4-hydroxybutyrate, 4-hydroxyvalerate, 5-hydroxyvalerate, and 6-hydroxyhexanoate, as long as they have the required degree of crystallinity. In an embodiment of the invention, the PHA is a co-polymer of poly-3-hydroxyhexanoate, e.g. poly(3-hydroxyhexanoate-co-3-hydroxyoctanoate) (PHOHHx). According to a further embodiment, the PHA can also be poly(3-hydroxyhexanoate-co-3-hydroxynonaoate) (PHNHHx), poly(3-hydroxyoctanoate) (PHO), poly(3-hydroxydecanoate) (PHD), or mixtures thereof. In another embodiment of the invention the PHA is a co-polymer of poly-4-hydroxybutyrate, e.g. poly(3-hydroxybutyrate-co-4-hydroxybutyrate).

Blends

Throughout the present invention weight percentage ("% wt") is 100 times the relation in weight (e.g. in grams or kilograms) between the component specified and the total weight of the blend in the same units.

The blends of the invention encompass a wide range of PHA loads. As shown in table 1 below, even low amounts of PHA with low crystallinity provide significantly more transparent blends than known mixtures which use highly crystalline PHAs (e.g., 3-PHB or 3-PHBHV). Also, they provide improved thermal stability (see table 3). Also, high loads of PHA with low crystallinity provide adhesive products. In one embodiment of the invention, the amount of PHA in the blend is between 0.05% and 30% wt, preferably between 0.1% and 25% wt, preferably between 0.2% and 20% wt, preferably between 0.5% and 15% wt with respect to the total weight of the blend. Loads of PHA having a crystallinity below 40% in amounts as low as from 0.05% to less than 5% wt with respect to the total weight of the blend, also provide the improved optical and mechanical properties of the invention. For example, the blend of the invention can comprise PHA having a crystallinity below 40% in amounts between 1% and 4.5% wt or between 1.5% and 4% wt with respect to the total weight of the blend. The blends having these amounts of PHA have excellent transparency and improved thermal and further mechanical properties, such as Charpy impact and fluency.

According to a further embodiment, the amount of PHA in the blend of the invention is between 10% and 60% wt, preferably between 15% and 55% wt, preferably between 20% and 50% wt, preferably between 30% and 50% wt with respect to the total weight of the blend. Higher loads of PHA with low crystallinity provide increased adhesiveness, and a further embodiment of the invention is a blend wherein the PHA with low crystallinity is more than 10% wt, preferably more than 15% wt, preferably more than 20% wt with respect to the total weight of the blend.

According to a further embodiment of the invention, the amount of PAC in the blend of the invention is between 75% and 99.9% wt, between 80% and 99.8% wt or between 85 and 99.5% wt. According to a further embodiment of the invention, the amount of PAC in the blend of the invention is between 40% and 90% wt, between 45% and 85% wt or between 50 and 80% wt, i.e. preferably below 85% wt or below 80% wt.

Any of the proportions of PHA and PAC can be combined to make new ranges of components of blends of the invention.

Where the PAC or the PHA include one or more chiral centers, the present invention includes mixtures of enantiomers or diastereoisomers, as well as enantiomerically pure compounds thereof. Thus, the present invention encompasses all possible isomers of a PAC or a PHA, "isomer" meaning species having atoms bonded in the same order but with different spatial distribution, for example, the present invention includes cis- and trans-isomers, E- and Z-isomers, R- and S-enantiomers, diastereomers, racemic mixtures thereof, or stereochemically enriched mixtures.

When a polymer is made of monomers including pending groups, the latter can arrange in space in different orientations with respect to each other, a property known as "tacticity", which in the present application takes its normal meaning, and refers to the stereoregularity of the orientation of the pending groups with respect to the polymer's backbone. In isotactic polymers all the substituents are located on the same side of the polymer's backbone. A 100% isotactic macromolecule consists of 100% meso diads. In syndiotactic polymers the substituents have alternating positions along the polymer's backbone. A 100% syndiotactic polymer consists 100% of racemo diads. Thus, the present invention encompasses both, isotactic and syndiotactic polymers, as well as intermediate situations between both, i.e. atactic polymers. An embodiment of the present invention includes a PAC, e.g. a PPC, which is isotactic or syndiotactic or atactic.

Also, the polymers of the invention may have different degrees of alternation, i.e. degree in which monomers of a co-polymer alternate each other. In an embodiment of the invention the PAC, e.g. PPC, is substantially alternating, i.e. the degree in which each alkylene oxide unit is followed by one carbon dioxide units is 100% (see for example Macromolecules 2012, 45, 8604-8613). It is thus considered according to the present invention that 100% alternating is a product of copolymerization of carbon dioxide and alkylene oxide in which all units of alkylene oxide are followed by one unit of carbon dioxide, and all units of carbon dioxide are followed by one unit of alkylene oxide, except of course for the ends of the chains. Alternatively, the degree of alternation in the PAC is more than 75%, preferably, more than 80%, preferably more than 90% in molar percent with respect to the total moles of the PAC. This microstructural characterization was measured by measuring the area of the representative peak in NMR. $^1$H and $^{13}$C NMR spectra were collected at ambient temperature using a Bruker AV500 spectrometer and chloroform as solvent. The spectra were referenced against an internal standard (TMS for $^1$H NMR spectra and CDCl$_3$ for $^{13}$C NMR).

The blends of the invention may comprise other polymers and additives commonly used in the art. These include, but are not limited to, plasticizers, antioxidants (e.g. hindered phenols), flame retardants, processing aids, filler (e.g. caolin, calcium carbonate, talcum, silica, or starch), or colorants. The nature and amounts of these additives depends on the application used in each case. The skilled person can choose among a wide variety known in the art, for example, from Encyclopedia of Polymer Science and Engineering, 2nd Ed., vol. 14, p. 327-410 or other reference information. Additives can be present in any amount suitable to achieve their function, and vary depending on the application required. Typical amounts are between 0.001% wt and 30% wt, for example, between 0.1% wt and 25% wt, or between 1% wt and 15% wt, with respect to the total weight of the blend.

According to a preferred embodiment, the blend of the invention comprises between 75% and 99.9% wt of PAC, up to 25% wt of a PHA with low crystallinity and optionally between 0.001% and 15% wt of additives. According to a further embodiment, the blend of the invention comprises between 85% and 98% wt of PAC, up to 15% wt of a PHA with low crystallinity and optionally between 0.001% and 10% wt of additives. According to a further embodiment, the blend of the invention comprises between 40% and 90% wt of PAC, up to 60% wt of a PHA with low crystallinity and optionally between 0.001% and 25% wt of additives. According to a further embodiment, the blend of the invention comprises between 50% and 80% wt of PAC, up to 50% wt of a PHA with low crystallinity and optionally between 0.001% and 25% wt of additives.

According to a further embodiment, the blend of the invention additionally comprises polylactic acid (PLA). The amount of PLA is typically comprised between 1% and 20% wt. Alternatively, the blend of the invention does not contain PLA.

The blend of the invention may also comprise polyvinylalcohol, the blend displaying decreased oxygen permeability. The amount of polyvinylalcohol is typically comprised between 1% and 20% wt.

According to an embodiment of the invention, the blend does not require a compatibilizer, which makes its preparation easier, more environmentally friendly and economic.

The components of the blend of the invention can be mixed following ordinary processes in the art such as those described in Encyclopedia of Polymer Science and Engineering, 2nd Ed., vol. 14, Polymer Blends chapter, page 9. Procedures well known to the skilled person are combining solutions of the blend components, by roller mixing or by compounding in an extruder or kneader and alike. In one embodiment, the PHA and the PAC are mixed, preferably in a high sheer mixer, at temperatures sufficient to molten the polymers, for example ranging from 20° C. to 250° C., typically between 100° C. and 200° C. Most blends of the invention are mixed at a temperature comprised between 140° C. and 190° C. Other additives in the sample can be added before or after mixing PHAs and PACs. In a further embodiment of the invention, the components are mixed in a suitable solvent. Any solvent that can dissolve all the components should be appropriate, and those which are volatile are preferred (e.g. THF, dichloromethane or acetone). After mixing is complete, the solvent is removed to provide the blend.

The unique properties and environmentally friendly nature of the blends of the invention allow their application in many different fields. Articles comprising the blends of the invention can be prepared according to the usual methods in the art. These include, but are not limited to injection molding; extrusion, melt processing, blowing, thermoforming, foaming, and casting. In an embodiment of the invention, the blend of the invention is used in the preparation of an article such as a film, preferably a transparent film, a mechanical structural part, an electronic part, an auto part, an optical device, a construction part or other objects of daily use. An embodiment of the invention is, for example, a PAC film comprising a blend of the invention wherein the PHA content is between 0.1% wt and 15% wt with respect to the total weight of the blend, preferably between 0.5% wt and 12% wt, and optionally between 0.001 and 10% wt of additives, the rest being one or more PACs. The films so formed have excellent transparency and improved thermal stability and resistance, and can even be used as medium barrier monolayers in the packaging industry, for example in the packaging of food and drinks.

In a further embodiment of the invention, the blend of the invention has a PHA content above 20% wt with respect to the total weight of the blend, preferably above 30% wt, for example, between 50% wt and 95% wt, the rest being one or more PACs and optionally between 0.001% and 15% wt of additives, and is used as an adhesive. The inventors have observed that the blends of the invention show a surprisingly high degree of adhesiveness when higher loads of PHA with low crystallinity are used. Such blends are therefore appropriate hot melt or pressure sensitive adhesives (PSA).

Further articles can be prepared with the blends of the invention. Some non-limiting examples are foamed trays for food or as protective elements of different goods, such as those of the electronic industry. Further non-limiting examples are extrusion-blow-molded bottles or extrusion hygiene, and in general biomedical products. Further non-limiting examples are toys, packaging products or furniture.

The following examples provide illustrate specific embodiments of the application for further reference, and should not be taken in any case as limitative of the scope of the invention.

EXAMPLES

Glossary of Terms

PPC1: >75% alternating polypropylene carbonate, Tg=19° C., Mw=120,000 Da.
PEC1: 100% alternating polyethylene carbonate, Tg=18° C., Mw=240,000 Da.
PPC-co-PHC: >75% alternating terpolymer polypropylene carbonate/polycyclohexane carbonate, Tg=118° C., Mw=150,000 Da.
PPC2: 100% alternating polypropylene carbonate, Tg=24° C., Mw=50,000 Da.
PPC3: >75% alternating polypropylene carbonate, Tg=24° C., Mw=240,000 Da.
PHOH Hx: poly-3-hydroxyoctanoate-co-poly-3-hydroxyhexanoate, Tg=−40° C., Mw=100,000 Da, Xc=17.50%.
P(3HB-co-4HB): poly 3-hydroxybutyrate-co-poly-4-hydroxybutyrate, Tg=−29° C., Mw=340,000 Da, Xc=2%.

PHOHD: poly-3-hydroxyoctanoate-co-poly-3-hydroxydecanoate, Tg=−60° C., Mw=115,000 Da, Xc=4%.
3-PH B: poly-3-hydroxybutyrate BIOMER, Tg=10° C., Mw=250,000 Da, Xc=73%.
3-PHBHV: poly-3-hydroxybutyrate-co-hydroxyvalerate ENMAT Yp1000 resin, Tg=4° C., Mw=374,000 Da, Xc=60%.
PLA: PLA NW 2003D, Tg=60° C., Mw=120000 Da; Xc=40%, as calculated according to example 4, the $\Delta H°m$ value obtained from Fischer, E. W., H. J. Sterzel, and G. Wegner, *Investigation Of Structure Of Solution Grown Crystals Of Lactide Copolymers By Means Of Chemical-Reactions.* Kolloid-Zeitschrift And Zeitschrift Fur Polymere, 1973. 251(11): p. 980-990.

Example 1: General Procedure in Haake Chamber

Each PAC and PHA were used in the proportions indicated in each case. They were mixed at a time and temperature sufficient to obtain an homogeneous mixture, typically at 170° C. and 50 rpm for 8 minutes. The samples from the mixer were compression molded at 170° C. and 100 bar for 3 min using a Collin polymer press to form squared plates for further characterizations.

Example 2: General Procedure for Mixture in Solution

Polyhydroxyalkanoate/polyalkylene carbonate blends with different weight ratios were prepared by solution casting from chloroform, and dried under vacuum at 80° C. to constant weight and films were obtained.

Example 3: Measurement and Determination of Transparency

Gardner Haze-Gard Plus instrument was used to measure the haze, clarity and visible light transmission of samples according to the UNE-EN 2155-9:1992 and UNE-EN ISO 13468-1:1997 (2 mm thickness plates). Samples were considered transparent for transmittances above 75%, preferably above 80%, preferably above 85%, preferably above 90%, more preferably above 95%.

The results are summarized below in table 1.

TABLE 1

| Blend No | PAC (wt) PHA(wt) | Transmittancy (%) |
|---|---|---|
| Comparative 1 | PPC1(95) ENMAT 3-PHBHV (5) | 56.1 |
| Comparative 2 | PPC1(90)BIOMER 3-PHB(10) | 47.6 |
| Comparative 3 | PPC1(90) PLA NW 2003D (10) | 86.0 |
|  | PPC1 | 92.4 |
| 1 | PPC1(99.5)PHOHHx(0.5) | 91.5 |
| 3 | PPC1(95)PHOHHx(5) | 89.3 |
| 4 | PPC1(90)PHOHHx(10) | 87.2 |
| 5 | PPC1(80)PHOHHx(20) | 83.3 |
| 6 | PPC1(70)PHOHHx(30) | 82.0 |
| 7 | PPC1 (99.5)/P(3HB-co-4HB) (0.5) | 90.3 |
| 8 | PPC1 (95)/P(3HB-co-4HB) (5) | 88.1 |
| 9 | PPC1(90)/PHOHD (10) | 86.9 |
| 10 | PPC1 (90)/PHOHHx (5)/PLA NW 2003D (5) | 87.6 |
|  | PEC | 93.6 |
| 11 | PEC(99.5)PHOHHx(0.5) | 92.2 |
| 13 | PEC(95)PHOHHx(5) | 87.1 |
| 14 | PEC(90)PHOHHx(10) | 85.6 |
| 15 | PEC(95)/P(3HB-co-4HB) (5) | 90.6 |
| 16 | PEC(90)/PHOHHx(5)/PLA NW 2003D(5) | 87.9 |
|  | PPC2 | 92.7 |
| 17 | PPC2 (99.5)/PHOHHx (0.5) | 91.3 |
| 19 | PPC2 (95)/PHOHHx (5) | 88.6 |
| 20 | PPC2 (90)/PHOHHx (10) | 87.9 |
| 21 | PPC2 (70)/PHOHHx (30) | 85.4 |
| 22 | PPC2 (90)/PHOHHx (5)/PLA NW 2003D (5) | 88.3 |

As shown in table 1, the blends according to the invention, i.e. having a PHA with low crystallinity, were transparent, while those having PHAs with high crystallinity (3-PHB, 3-PHBHV) were not transparent. It was further surprising to observe that transparency was accompanied by comparable or even increased resistance to impact, as proven by higher Charpy values. Charpy impact was analyzed using a CEAST Resil Impactor 18342 under the UNE-EN ISO 179-1:2011 (ISO179-1/1eA) standard method at 23° C. and 50% of humidity with 80×10×4 mm (width×length×thickness) of sample's dimension. This improvement in Charpy impact in itself represents an improvement with respect to mixtures having highly crystalline PHA (e.g. PHBHV, PLA). See in Table 2 comparative blend 1 versus blend 3 according to the invention. These properties were observed for smaller or larger amounts of PHA with low crystallinity, a surprising behavior which opens the door to a wide range of applications, as shown in Table 2.

TABLE 2

| Blend No | PAC (wt) PHA(wt) | Impact Charpy 23° C. (kJ/m$^2$) |
|---|---|---|
| Comparative 1 | PPC1(95) ENMAT 3-PHBHV (5) | 2.2 |
| Comparative 3 | PPC1(90) PLA NW 2003D (10) | 1.7 |
|  | PPC1 | 2 |
| 1 | PPC1(99.5)PHOHHx(0.5) | 2.2 |
| 2 | PPC1(98)PHOHHx(2) | 2.4 |
| 3 | PPC1(95)PHOHHx(5) | 2.6 |
| 4 | PPC1(90)PHOHHx(10) | 2.7 |
| 7 | PPC1 (99.5)/P(3HB-co-4HB) (0.5) | 2.3 |
| 7A | PPC1 (98)/P(3HB-co-4HB) (2) | 2.5 |
| 7B | PPC1 (96)/P(3HB-co-4HB) (4) | 2.6 |
| 10 | PPC1 (90)/PHOHHx (5)/PLA NW 2003D (5) | 2.5 |
|  | PPC2 | 1 |
| 17 | PPC2 (99.5)/PHOHHx (0.5) | 1.10 |
| 18 | PPC2 (98)/PHOHHx (2) | 1.20 |
| 19 | PPC2 (95)/PHOHHx (5) | 1.23 |
| 20 | PPC2 (90)/PHOHHx (10) | 1.28 |
| 21 | PPC2 (70)/PHOHHx (30) | 1.31 |
| 22 | PPC2 (90)/PHOHHx (5)/PLA NW 2003D (5) | 1.21 |
|  | PPC3 | 2.4 |
| 23 | PPC3(95)PHOHHx(5) | 3 |

Further, the blends of the invention proved to be useful for different PACs at different loads and, for example, polyethylene carbonate also provided transparent blends, as shown in table 1 while improving thermal stability, as shown in Table 3 below and FIG. 2.

TABLE 3

| Blend No | PAC (wt) PHA(wt) | Descompositon T (° C.) |
|---|---|---|
| Comparative 1 | PPC1(95)TIANAN 3-PHBHV (5) | 276.27 |
| Comparative 2 | PPC1(90)BIOMER 3-PHB(10) | 277.84 |
| Comparative 3 | PPC1(90) PLA NW 2003D (10) | 278.15 |
|  | PPC1 | 248 |
| 1 | PPC1(99.5)PHOHHx(0.5) | 270.64 |
| 2 | PPC1(98)PHOHHx(2) | 271.94 |
| 3 | PPC1(95)PHOHHx(5) | 278.13 |
| 4 | PPC1(90)PHOHHx(10) | 279.48 |
| 5 | PPC1(80)PHOHHx(20) | 291.02 |
| 6 | PPC1(70)PHOHHx(30) | 293.87 |
| 7 | PPC1 (99.5)/P(3HB-co-4HB) (0.5) | 260.45 |
| 7A | PPC1 (98)/P(3HB-co-4HB) (2) | 267.82 |
| 7B | PPC1 (96)/P(3HB-co-4HB) (4) | 271.16 |
| 8 | PPC1 (95)/P(3HB-co-4HB) (5) | 278.42 |
| 9 | PPC1(90)/PHOHD (10) | 278.69 |
| 10 | PPC1 (90)/PHOHHx (5)/PLA NW 2003D (5) | 279.92 |
|  | PEC | 214 |
| 11 | PEC(99.5)PHOHHx(0.5) | 240.27 |
| 12 | PEC(98)PHOHHx(2) | 249.35 |
| 13 | PEC(95)PHOHHx(5) | 255.38 |
| 14 | PEC(90)PHOHHx(10) | 264.11 |
| 15A | PEC(98)/P(3HB-co-4HB) (2) | 241.56 |
| 15B | PEC(96)/P(3HB-co-4HB) (4) | 246.37 |
| 15 | PEC(95)/P(3HB-co-4HB) (5) | 261.45 |
| 16 | PEC(90)/PHOHHx(5)/PLA NW 2003D(5) | 265.00 |
|  | PPC2 | 260 |
| 17 | PPC2 (99.5)/PHOHHx (0.5) | 288.86 |
| 18 | PPC2 (98)/PHOHHx (2) | 292.03 |
| 19 | PPC2 (95)/PHOHHx (5) | 292.32 |
| 20 | PPC2 (90)/PHOHHx (10) | 294.11 |
| 21 | PPC2 (70)/PHOHHx (30) | 281.9 |
| 22 | PPC2 (90)/PHOHHx (5)/PLA NW 2003D (5) | 297.73 |
|  | PPC3 | 244.12 |
| 23 | PPC3(95)PHOHHx(5) | 257.1 |
| 24 | PPC3 (90)/PHOHHx (10) | 260 |
| 25 | PPC3 (70)/PHOHHx (30) | 265 |
| 26 | PPC3(90)/PHOHX (5)/PLA 2003D (5) | 275.3 |
|  | PPC-co-PHC | 263 |
| 27 | PPC-co-PHC(95)/PHOHHx (5) | 291.48 |

When comparing Comparative example 3 and blend 4 with blend 10, it can be appreciated that low crystallinity PHA and PLA together provide a synergistic improvement on thermal stability. While comparative example 3 (10% PLA) improves thermal stability to 278.15° C. and blend 4 (10% PHOHHx) further improves it to 279.48° C., blend 22 (5% PLA+5% PHOHHx) improves it even further above both, to 279.92° C.

Example 4: Measurement and Determination of Crystallinity of PHAs Used

The degree of crystallinity (Xc) was taken from the first heating at 10° C./min (−85° C. to 200° C.) using DSC (see details of description of the invention) The crystallinity was calculated using the equation:

$$X_c = (\Delta H_m / \Delta H°_{PHB}) \times 100$$

ΔH°PHB is the enthalpy of melting of pure 3-PHB crystals 146 J g$^{-1}$ (L. M. W. K. Gunaratne, R. A. Shanks Thermochimica Acta 430 (2005) 183-190) and ΔHm the measured enthalpy of melting for each polymer.

Polymers (1 g) were dissolved in 100 mL of chloroform and filtered under vacuum to remove any insoluble fraction or impurities. Semi-crystalline films were obtained by solvent casting at room temperature. The resulting films were further dried in vacuum at 50° C. for 3 h to remove any residual solvent and moisture. Films were stored in desiccator under nitrogen atmosphere prior to use.

The DSC melting scans of samples were obtained with an average heating rate of 10° C. min$^{-1}$ from −85 to 180° C. Specific heat calculation from heat flow response of the DSC scans was carried out using the area method. The data for each isothermal segment was collected to within a 0.005 mW s$^{-1}$ baseline criteria. The heat flow data from the DSC scans were used to calculate the apparent thermodynamic heat capacity (Cp,ATD) and IsoK baseline heat capacity (Cp,IsoK). All DSC curves were corrected using an appropriate baseline recorded under identical conditions with matched empty aluminium pans when converting to specific heat capacity curves. From the DSC heating scans the enthalpy of melting (ΔHm) were determined.

Example 5: Measurement and Determination of Tg of the PHAs Used and the Blends Glass transition temperature (Tg) was taken from the second heating in differential scanning calorimeter (DSC) experiments according to the following procedure. Non-isothermal (10° C./min from −85 to 200° C.) experiments were carried out using a DSC TA Instruments Q2000 under nitrogen flow, operating with an intra-cooler under nitrogen flow. Temperature and heat flow calibrations were performed with indium as standard. The glass transition temperature was taken from the second heating.

Example 6: Measurement of Thermal Stability

Thermal stability of the blends of the invention has been found to be surprisingly improved compared to blends having highly crystalline PHAs, while maintaining good or acceptable transparency. When comparing PPC blends of 3-PHB or 3-PHBHV (comparative blends 2 and 1) with the same load of PHOHHx (blends 3 and 4 according to the invention), the later showed higher TGA values and were transparent, as shown in table 3 below. A Mettler TGA instrument was used for the thermogravimetric measurements. Non-isothermal experiments were performed in the temperature range 30-700° C., at heating rate of 5° C./min in nitrogen atmosphere. TGA value is taken from the first maximum of the derivative thermogravimetric curves (DTG).

Thermal stability was further increased in blends with a higher content of PHAs with low crystallinity according to the invention, while not significantly affecting transparency. Blends 1, 2, 3, 4, 5 and 6 in table 3 (see also FIG. 1) show that the increase in thermal stability can be observed in a surprisingly wide range of PHA load that still maintains good transparency. A load of 0.5% wt of PHOHHx (blend 1) already raises TGA to 270.64° C., and loads of 30% wt (blend 6) further increase TGA to 293.87° C., while maintaining transparency. It is significant that a few blends having high cristallinity PHAs showed acceptable thermal stability, but were however opaque, and thus useless for a number of applications.

It has been further observed that increase in thermal stability is a general trend, and other PPCs also benefit from blending with the PHAs having low crystallinity used in the blends of the present invention, as shown in table 3.

Figure 2:
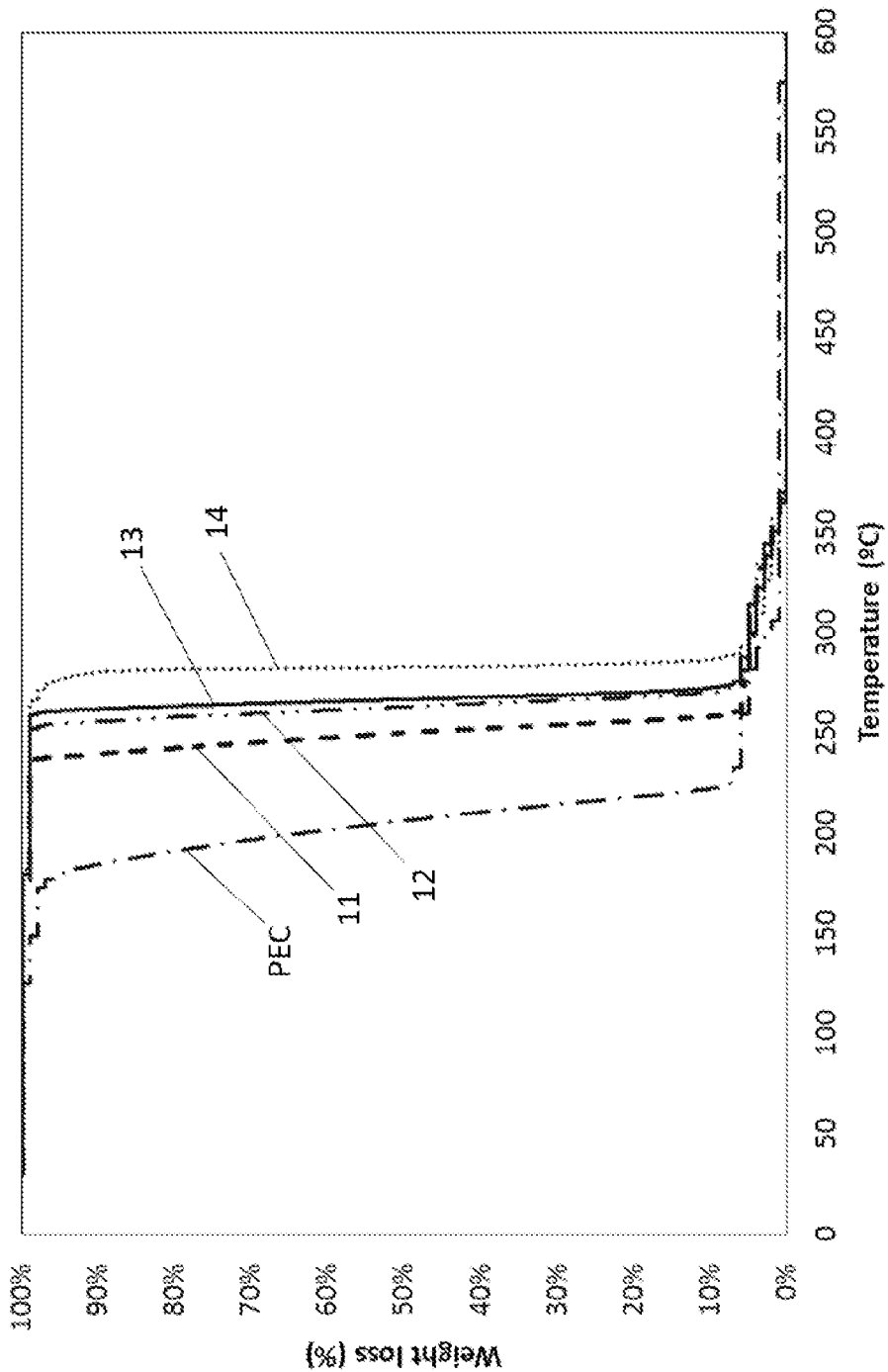
FIG. 2: TGA of PEC [100%], blend 11 (PEC [99.5%] & PHOHHX [0.5%]), blend 12 (PEC [98%] & PHOHHX [2%]), blend 13 (PEC [95%] & PHOHHX [5%]) and blend 14 (PEC[90%] & PHOHHX [10%]).

The same general trend was observed for PEC as shown in table 3 above and FIG. 2.

Example 7: Measurement of Adhesiveness

The blends of the invention have also been found to have adhesive properties. Experiments were conducted to measure the degree of adhesiveness.

For measurement of hot tack texture analysis equipment was used: TA.XT2i Texture Analyzer (Stable Microsystems, Surrey, England). The sample was placed in a thermally insulated chamber covered with aluminum, whose temperature can be controlled by an external thermocouple. Measurement of tackiness (tack) was performed at different temperatures between 23° C. and 100° C., the temperature being determined by a thermocouple placed in contact with the sample.

A cylindrical stainless steel rod (3 mm diameter) was used (with smooth contact) the testing experimental conditions being the following:

Approach speed of the rod to the sample: 0.1 mm/s
Force applied to the sample: 5N
Time of application of force: 1 s
Separation speed of rod from the sample: 1 mm/s Samples were prepared by depositing about 2 g of adhesive on a steel plate (7×7×0.01 cm), which was heated at 180° C. and then allowed to cool on a smooth surface to achieve a homogeneous film thickness.

The results of these measurements are set out in Table 4.

TABLE 4

| Blend No | PAC (wt) PHA(wt) | Tack max (KPa) | Temperature for tack max (° C.) |
|---|---|---|---|
| Comparative 1 | PPC1(90)TIANAN 3-PHBHV (10) | NO | — |
| Comparative 2 | PPC1(90)BIOMER 3-PHB(10) | NO | — |
| Comparative 3 | PPC1(95) PLA NW 2003D (5) | NO | — |
| 4 | PPC1(90)PHOHHx(10) | 200 | 85 |
| 5 | PPC1(80)PHOHHx(20) | 245 | 80 |
| 6 | PPC1(70)PHOHHx(30) | 257 | 75 |
| 14 | PEC(90)PHOHHx(10) | 388 | 30 |
| 20 | PPC2 (90)/PHOHHx (10) | 225 | 80 |
| 21 | PPC2 (70)/PHOHHx (30) | 268 | 70 |
| 25 | PPC3 (70)/PHOHHx (30) | 234 | 80 |

Comparative blends 1, 2 and 3 with highly crystalline PHAs lack adhesiveness. Comparative blends 1 and 2 also lack transparency. On the other hand, the blends of the invention having PHAs with low crystallinity show adhesiveness even at relatively low loads of said low crystallinity PHA.

Additionally, high loads of low crystalline PHA were investigated.

The use of singular noun or pronoun when used with the term "comprising" in the claims and/or specification means "one", and also includes "one or more", "at least one", and "one or more than one". Throughout this application, the term "about" used to identify any values shown or appeared herein may be varied or deviated. The variation or deviation may be caused by errors of devices and methods used to determine a variety of values.

The terms "comprise", "have", and "include" are open-ended linking verbs. One or more forms of these verbs such as "comprise", "which comprise", "have", "which have", "include", "which include" are also open-ended. For example, any methods, which "comprise", "have", or "include" one or more steps, are not limited to possess only the one or those more steps, but also cover all unidentified steps.

The invention claimed is:

1. A blend comprising between 40% and 99.5% wt of at least one poly(alkylene carbonate) and between 0.5% and 30% wt of at least one polyhydroxyalkanoate, with respect to the total weight of the blend, wherein said at least one polyhydroxyalkanoate has a degree of crystallinity of less than 40%, wherein crystallinity is determined by DSC when measured by heating a sample from −85° C. to 200° C. with a heating ramp of 10° C./min and applying the formula $Xc=(\Delta Hm/\Delta H°PHB)\times 100$, wherein $\Delta H°PHB$ is 146 J g−1 and $\Delta Hm$ the measured enthalpy of said polyhydroxyalkanoate; wherein at least one of the monomers of said polyhydroxyalkanoate comprises 7 or more carbon atoms, and all monomers of said polyhydroxyalkanoate comprise more than 6 carbon atoms.

2. The blend according to claim 1, wherein said at least one polyhydroxyalkanoate has a crystallinity of less than 35%.

3. The blend according to claim 1, wherein said at least one polyhydroxyalkanoate has a Tg in the range between −80° C. to −5° C. wherein said Tg is determined by DSC.

4. The blend according to claim 1, wherein said at least one polyhydroxyalkanoate is a polymer of formula (III), or a stereoisomers thereof

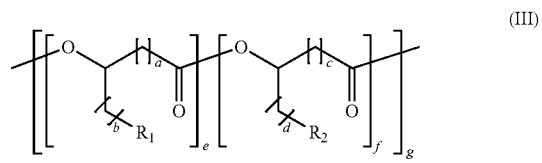

(III)

wherein e, f or g are each independently an integer comprised between 0 and 10,000, as long as g is at least 1 and the sum of e and f is at least 1;
c is an integer between 0 and 10;
a is an integer between 0 and 10;
wherein at least one of a or c is 2 or more;
b and d are integers independently selected from 0 to 15; and
each of R1 and R2 is independently selected from hydrogen or methyl wherein at least one of the monomers of said polyhydroxyalkanoate comprises 7 or more carbon atoms, and all monomers of said polyhydroxyalkanoate comprise more than 6 carbon atoms.

5. The blend according to claim 1, wherein said at least one polyhydroxyalkanoate is a copolymer.

6. The blend according to claim 1, wherein the poly (alkylene carbonate) is alternating in more than 75% molar with respect to the total of the poly(alkylene carbonate).

7. An article comprising the blend defined in claim 1.

8. A process for manufacturing the blend defined in claim 1 comprising the step of mixing at least one poly(alkylene carbonate) with at least one polyhydroxyalkanoate than has a degree of crystallinity of less than 40%, wherein crystallinity is determined by DSC when measured by heating a sample from −85° C. to 200° C. with a heating ramp of 10° C./min and applying the following formula. $Xc=(\Delta Hm/\Delta H°PHB)\times 100$, wherein $\Delta H°PHB$ is 146 J g−1 and $\Delta Hm$ the measured enthalpy of said polyhydroxyalkanoate.

9. A process for manufacturing articles comprising the step of molding the blend defined in claim 1.

10. An adhesive comprising the blend defined in claim 1.

11. The blend according to claim 1, wherein said at least one polyhydroxyalkanoate has a crystallinity of less than 30%.

12. The blend according to claim 1, wherein said at least one polyhydroxyalkanoate has a crystallinity of less than 25%.

13. The blend according to claim 1, wherein said at least one polyhydroxyalkanoate has a crystallinity of less than 20%.

14. A blend comprising between 40% and 99.5% wt of at least one poly(alkylene carbonate) and between 0.5% and 30% wt of at least one polyhydroxyalkanoate, with respect to the total weight of the blend, wherein said at least one polyhydroxyalkanoate has a degree of crystallinity of less than 40%, wherein crystallinity is determined by DSC when measured by heating a sample from −85° C. to 200° C. with a heating ramp of 10° C./min and applying the formula $Xc=(\Delta Hm/\Delta H°PHB)\times 100$, wherein $\Delta H°PHB$ is 146 J g−1 and $\Delta Hm$ the measured enthalpy of said polyhydroxyalkanoate, and further comprising polylactic acid.

15. A blend comprising between 40% and 99.5% wt of at least one poly(alkylene carbonate) and between 0.5% and 30% wt of at least one polyhydroxyalkanoate, with respect to the total weight of the blend, wherein said at least one polyhydroxyalkanoate has a degree of crystallinity of less than 40%, wherein crystallinity is determined by DSC when measured by heating a sample from −85° C. to 200° C. with a heating ramp of 10° C./min and applying the formula $Xc=(\Delta Hm/\Delta H°PHB)\times 100$, wherein $\Delta H°PHB$ is 146 J g−1 and $\Delta Hm$ the measured enthalpy of said polyhydroxyalkanoate;

wherein said at least one polyhydroxyalkanoate is a polymer of formula (II), or a stereoisomers thereof

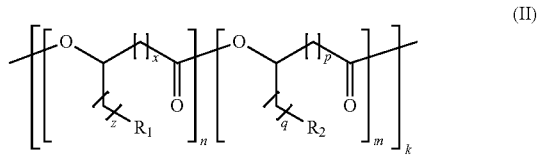

(II)

wherein n, m or k are each independently an integer comprised between 1 and 10,000;
p and q are integers adding between 3 and 17;
x and z are integers adding between 4 and 17; and
each of R1 and R2 is independently selected from hydrogen or methyl.

* * * * *